United States Patent [19]

Toga et al.

[11] Patent Number: 4,599,460
[45] Date of Patent: Jul. 8, 1986

[54] POLYALKYLENE ETHER GLYCOL COPOLYMERS

[75] Inventors: Yuzo Toga; Ichiro Okamoto; Tatsuya Kanno, all of Himeji, Japan

[73] Assignee: Daicel Chemical Industries, Ltd., Osaka, Japan

[21] Appl. No.: 765,563

[22] Filed: Aug. 13, 1985

Related U.S. Application Data

[63] Continuation of Ser. No. 511,380, Jul. 6, 1983, abandoned.

[30] Foreign Application Priority Data

Apr. 13, 1983 [JP]  Japan .................... 58-64801

[51] Int. Cl.⁴ ................ C07C 41/01; C07C 43/10
[52] U.S. Cl. ................................................ 568/617
[58] Field of Search .................................... 568/617

[56] References Cited

U.S. PATENT DOCUMENTS

| | | | |
|---|---|---|---|
| 4,139,567 | 2/1979 | Pruckmayr ......................... | 568/613 |
| 4,202,964 | 5/1980 | Pruckmayr et al. ................ | 568/617 |
| 4,228,272 | 10/1980 | Del Pesco ......................... | 568/617 |

*Primary Examiner*—Howard T. Mars
*Attorney, Agent, or Firm*—Flynn, Thiel, Boutell & Tanis

[57] ABSTRACT

Polyalkylene ether glycol copolymers having a number-average molecular weight of from 200 to 10,000 and having hydroxyl groups at both ends of the molecule are disclosed. The copolymers are comprised of recurring structural units of the following formulae (I) and (II) in a molar ratio range (I/II) of from 1/99 to 99/1:

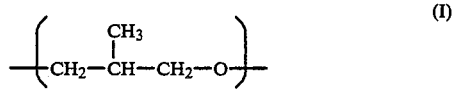

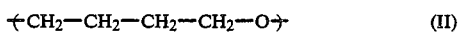

10 Claims, 2 Drawing Figures

POLYALKYLENE ETHER GLYCOL COPOLYMERS

This application is a continuation of U.S. Ser. No. 511,380, filed July 6, 1983, now abandoned.

The present invention relates to new polyalkylene ether glycol copolymers.

More particularly, the present invention relates to new polyalkylene ether glycol copolymers containing 2-methylpropylene ether groups and tetramethylene ether groups as recurring structural units of the copolymers.

Known polyalkylene ether glycols include polyethylene glycol, poly-1,2- and 1,3-propylene ether glycol, polytetramethylene ether glycol, polyhexamethylene ether glycol and copolymers of them. They have been used widely as lubricants or as starting materials for preparing lubricants used in the molding of rubbers and in the treatment of fibers, ceramics and metals. They have also been used as important starting materials for preparing cosmetics and medicines, as starting materials or additives for water-based paints, paper coatings, adhesives, cellophane, printing inks, abrasives and surfactants and as starting materials for preparing resins, such as alkyd resins.

Thermoplastic elastomers having an intrinsic molecular structure which exhibits elastic properties, unlike elastomers formed in the prior art by chemical cross-linking, such as rubber, have been developed and widely used in practice. The thermoplastic elastomers have various advantages, for example, they can be processed easily, the processing time is short, scraps of them can be reutilized easily and wide ranges of mechanical properties ranging from rigid to soft properties can be obtained easily. These elastomers are expected to have great commercial possibilities because they fill gaps that exist between conventional thermoplastic resins, thermosetting resins and vulcanized rubbers. The thermoplastic elastomers now available on the market can be classified broadly into the groups of poly(styrene-butadiene), polyesters, polyamides, polyurethanes and blends of ethylene/propylene copolymer rubber with polypropylene. Except for the latter blend, they are typical block copolymers obtained by incorporating blocks of soft and hard segments into a straightchain structure in the course of the polymerization. As compounds that are frequently used as the soft segments for elastomers, such as polyester, polyamide and polyurethane elastomers, there can be mentioned polyalkylene ether glycols. The reason for this is that because the polyalkylene ether glycols have hydroxyl groups at both ends thereof, they are highly reactive with carboxyl and isocyanate groups whereby to form ester and urethane bonds, respectively. Further, since the polyalkylene ether glycols have ether bonds in their skeletons, the resulting polymers have a high elasticity and excellent properties, such as low temperature properties and resistance to hydrolysis, salt water and bacteria. The function of the polyalkylene ether glycol as the soft segment is closely related to the chemical structure and physical properties thereof. To exhibit the above-mentioned advantages, it is desirable, from the viewpoint of reactivity, that the hydroxyl groups at both ends of the alkylene ether glycol are primary hydroxyl groups and, from the viewpoints of elasticity and elastic recovery, that it has a low glass transition temperature and that it per se does not crystallize, even when it has a high molecular weight. However, polyalkylene ether glycols having both the above-mentioned chemical structure and physical properties have not been known. For example, polyethylene glycol and polytetramethylene ether glycol, which are used frequently as soft segments, have a high reactivity because they have primary hydroxyl groups at both ends. However, if they have a molecular weight of higher than about 1500, they crystallize and become unable to exhibit a sufficient function as the soft segments of the thermoplastic elastomer. On the other hand, polypropylene ether glycols have an unfavorably poor reactivity because one of their terminal hydroxyl groups is a secondary hydroxyl group, although they are advantageous in that they scarcely crystallize even when the molecular weights thereof are increased. There have been known polyalkylene ether glycols having primary hydroxyl groups at both ends which polymers are obtained by copolymerizing propylene oxide with ethylene oxide and which polymers scarcely crystallize even when the molecular weights thereof are increased. However, they cannot exhibit sufficient elasticity and elastic recovery effects required of the soft segments of the thermoplastic elastomer because the carbon chain in the repeating unit is rigid due to their chemical structures.

After intensive investigations in view of these circumstances, the inventors have discovered new polyalkylene ether glycol copolymers, preferably having a number-average molecular weight of 200 to 10,000, and having hydroxyl groups at both ends of the molecule in which the recurring structural units of the copolymers are units of the following formulae (I) and (II), preferably copolymerized in a molar ratio (I/II) in the range of from 1/99 to 99/1:

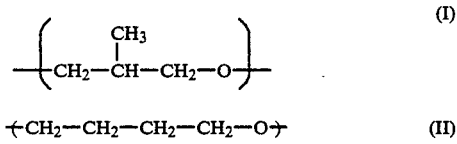

The polyalkylene ether glycol copolymers of the present invention have 2-methylpropylene ether groups (I) and tetramethylene ether groups (II) as repeating units and they have primary hydroxyl groups at both ends. The molar ratio of the units (I) to units (II) is preferably 5/95 to 95/5 and the copolymer preferably has a number-average molecular weight of 500 to 6,000. The copolymer of the present invention is quite flexible due to its chemical structure. The copolymer scarcely crystallizes even when it has a high molecular weight. The copolymer exhibits sufficient elasticity and elastic recovery effects. The polyalkylene ether glycol copolymer, according to the invention, is easily reactive with carboxyl and isocyanato groups. Thus, it is suitable for use as the soft segments in the production of elastomers of polyesters, polyamides, polyurethanes and the like.

The new polyalkylene ether glycol copolymers of the present invention can be obtained easily by ring-opening copolymerization of 3-methyloxetane with tetrahydrofuran, in the presence of an acid catalyst. The molar ratio of 3-methyloxetane to tetrahydrofuran being reacted is not particularly limited. However, the preferred molar ratio of 3-methyloxetane/tetrahydrofuran is 1/99 to 99/1, particularly 99-10/1-90. During the reaction to form the copolymer, 3-methyloxetane and tetrahydrofuran should be present in a 3-methyloxetane/tetrahydrofuran molar ratio of higher than 1, since the former has a reactivity far higher than that of the latter. If the molar ratio is less than 1, 3-methyloxetane is consumed rapidly and, consequently, some tetrahydrofuran homopolymer is formed. In some applications, a polyalkylene ether glycol mixture will suffice and separation of the homopolymer is unnecessary. Further, a highly random copolymer can be obtained by successive addition polymerization of 3-methyloxetane. In addition, a block copolymer can be obtained easily by effecting the polymerization of tetrahydrofuran to a partial extent and then adding 3-methyloxetane to the reaction system to continue the polymerization. 3-Methyloxetane and tetrahydrofuran can be handled easily, since they are in liquid form at ambient temperature. The ring-opening copolymerization reaction of them proceeds easily in the presence of an acid catalyst.

3-Methyloxetane is obtained by, for example, reacting 2-methyl-1,3-propanediol with acetyl chloride to obtain 3-chloro-2-methylpropyl acetate and then effecting ring closure of the product by alkali fusion. As the acid catalysts used in the ring-opening copolymerization, there can be mentioned hydroacids, such as perchloric acid/fuming sulfuric acid, perchloric/acid/acetic anhydride or fluorosulfonic acid. Although other known catalysts generally used for the ring-opening polymerization of oxetane, such as boron trifluoride/diethyl ether complex, trialkylaluminum, phosphorus pentafluoride, antimony pentafluoride and various Lewis acids, can be used as the copolymerization catalysts, the above-mentioned hydroacid catalysts are particularly preferred because hydroxyl groups can be introduced at both ends of the copolymers by a suitable treatment, such as saponification in the latter case.

The polyalkylene ether glycol copolymers of the present invention can be used not only as the soft segments of elastomers of polyesters, polyamides, polyurethanes, or the like, but also as lubricants or starting materials therefor, starting materials for preparing cosmetics and medicines, starting materials or additives for water-based paints, paper coatings, adhesives, cellophanes, coating inks, abrasives and surfactants and as starting materials for resins such as alkyd resins.

The following examples will further illustrate the present inventon, which by no means limit the invention. In the examples, parts are given by weight and the products were identified by the following methods:

(1) Nuclear magnetic resonance spectrum:

A nuclear magnetic resonance device JNM-C-60HL (a product of Nihon Denshi Co.) was used for the measurement.

(2) Infrared absorption spectrum:

A grating infrared spectrophotometer IRA-2 (a product of Nihon Bunko Co.) was used for the measurement.

(3) Hydroxyl value:

Hydroxyl value was determined according to JIS K 1557.

(4) Molecular weight distribution:

The molecular weight distribution was determined at 40° C. at a flow rate of 1.0 ml/min using a high performance liquid chromatographic device TRI ROTAR SR (a product of Nihon Bunko Co.), Shodex GPC A-80 M (a product of Showa Denko Co.) as the column, differential refractometer Shodex RI SE-31 as the detector and tetrahydrofuran as the mobile phase.

EXAMPLE 1

100 parts of 2-methyl-1,3-propanediol were mixed with 101 parts of acetyl chloride. The mixture was heated to 100° C. for 8 h to obtain 151 parts (yield: 90%) of 3-chloro-2-methylpropyl acetate. 100 parts of this acetate were treated with a solution of potassium hydroxide/sodium hydroxide to obtain 31 parts (yield: 58%) of the ring-closure product, namely, 3-methyloxetane. The 3-methyloxetane thus obtained and tetrahydrofuran were refluxed separately in the presence of metallic sodium for 2 to 3 hours, rectified and subjected to the copolymerization immediately thereafter. In the reaction, 79 parts of 3-methyloxetane and 21 parts of tetrahydrofuran were charged in a nitrogen-purged, dry reactor. The reactor was cooled externally with a dry ice/methanol freezing mixture to maintain the internal temperature at −60° C. while the contents of the reactor were stirred. Then, 1.53 parts of acetic anhydride were added thereto while the temperature was maintained at −60° C. and 2.35 parts of 70% perchloric acid were slowly added dropwise thereto. The temperature of the reaction mixture was elevated to room temperature under stirring for about 5 h and the reaction was continued at room temperature for an additional 100 h. Thereafter about 300 parts of distilled water was added thereto to terminate the reaction. The temperature was elevated to remove unreacted monomers. The mixture was kept at a temperature of about 90° C. under stirring for 2 h. The mixture was left to stand, an aqueous layer thus formed was removed and about 200 parts of 0.5 N potassium hydroxide/ethanol solution was added thereto. The mixture was refluxed under stirring for 2 h to saponify the end groups. After completion of the saponification, ethanol was distilled off. Benzene was added thereto to form a benzene solution. An inorganic salt formed by the saponification and excess solid potassium hydroxide precipitated were filtered off. The filtrate was treated with active china clay. The product was decolored with active carbon, if necessary. The resulting liquid was exactly neutral. Benzene was expelled from the liquid completely under reduced pressure to obtain 69 parts by weight of the intended polyether copolymer of the present invention. The polymerization conversion was 69%.

Figure 1:
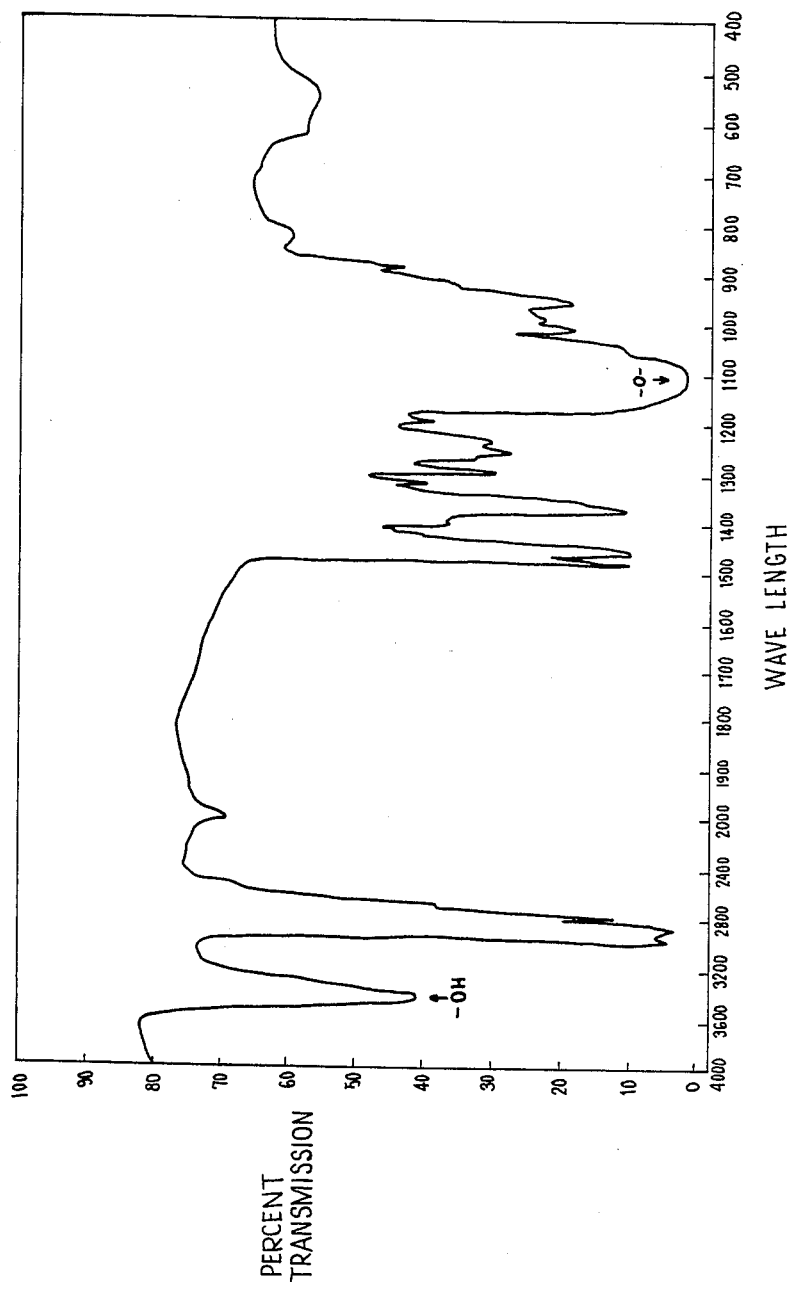
FIG. 1 is an infrared absorption spectrum of the polyether copolymer obtained in Example 1.
Figure 2:
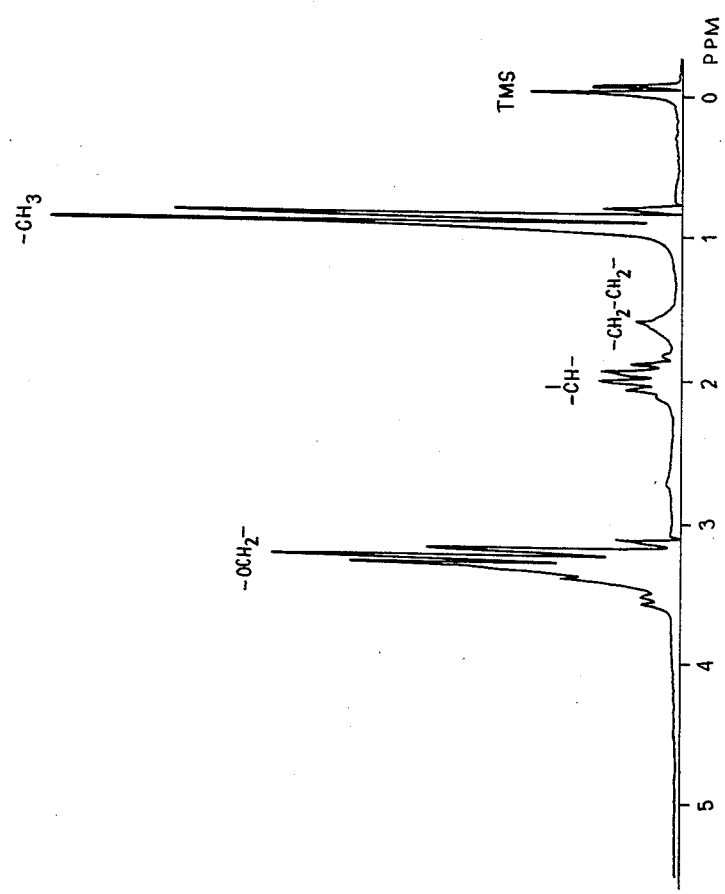
FIG. 2 is the nuclear magnetic resonance spectrum thereof.

The thus-obtained polyether copolymer was a colorless, transparent, viscous liquid. The infrared absorption and nuclear magnetic resonance spectra of the product are shown in FIGS. 1 and 2, respectively. In the infrared absorption spectrum, the characteristic absorption due to the tetramethylene ether group is recognized at 1200 cm$^{-1}$. From the infrared absorption and nuclear magnetic resonance spectra, it was revealed that the product was a polyether copolymer comprising 91.3 molar % of 2-methylpropylene ether group and 8.7 molar % of tetramethylene ether group. The average molecular weight calculated from the hydroxyl value was 1527.

The molecular weight distribution curve obtained according to the high performance liquid chromatography comprised a completely symmetrical peak. $\overline{Mw}/\overline{Mn}$ (calculated as polystyrene) was 2.20 ($\overline{Mw}$ being weight-average molecular weight and $\overline{Mn}$ being number-average molecular weight).

EXAMPLE 2

48.6 parts of 3-methyloxetane obtained in the same manner as described in Example 1, 51.4 parts of tetrahydrofuran purified by dehydration distillation and 1.5 parts of acetic anhydride were charged in a nitrogen-purged, desiccated reactor. The reactor was cooled externally with a dry ice/methanol freezing mixture to control the internal temperature to −60° C. while the contents of the reactor were stirred. Then, 2.3 parts of 70% perchloric acid were added dropwise and slowly thereto. After completion of the addition, the temperature of the reaction mixture was elevated to 40° C. in about 5 h. The stirring was continued at that temperature for an additional 20 h. The termination of the reaction and purification were effected in the same manner as described in Example 1 to obtain 56 parts of a colorless, transparent, viscous liquid. The polymerization rate was 56%.

From the nuclear magnetic resonance and infrared absorption spectra, it was revealed that the resulting polyether copolymer contained 78.3 molar % of 2-methylpropylene ether group and 21.7 molar % of tetramethylene ether group. The average molecular weight calculated from the hydroxyl value was 1264. $\overline{Mw}/\overline{Mn}$ determined from the high performance liquid chromatograph was 1.80 (calculated as polystyrene).

EXAMPLE 3

19.1 parts of 3-methyloxetane obtained in the same manner as in Example 1 and 80.9 parts of tetrahydrofuran purified by dehydration distillation were charged in a nitrogen-purged reactor. The reactor was cooled externally with a dry ice/methanol freezing mixture to control the internal temperature to −60° C. while the contents of the reactor were stirred. 11.1 parts of fluorosulfonic acid were added dropwise and slowly thereto so as to maintain the internal temperature at −60° C. After completion of the addition, the temperature of the reaction mixture was elevated to 0° C. in about 4 h. The stirring was continued at that temperature for 10 h. 300 parts of distilled water were added to the reaction mixture. The mixture was stirred at a temperature of at least 90° C. for 2 h and then left to stand. A lower aqueous layer thus formed was removed and 300 parts of distilled water were added thereto. This operation was repeated to saponify the end groups of the copolymer into hydroxyl groups. 300 parts of benzene were added to the separated reaction product layer and the mixture was stirred to obtain a homogeneous solution. 2 parts of calcium hydroxide were added to the solution. After thorough stirring, the acid remaining in the reaction product was neutralized. Water contained in the benzene solution was removed by azeotropic distillation with benzene. A small amount of benzene was added thereto and an inorganic solid suspended in the solution was filtered off. Benzene was distilled off from the filtrate to obtain 46 parts of a copolymer in the form of a colorless, transparent, viscous liquid. The polymerization conversion was 46%.

From the infrared absorption and nuclear magnetic resonance spectra, it was revealed that the resulting polyether copolymer comprised 35.8 molar % of 2-methylpropylene ether group and 64.2 molar % of tetramethylene ether group.

The average molecular weight calculated from the hydroxyl value was 1825. $\overline{Mw}/\overline{Mn}$ determined from the high performance liquid chromatograph was 2.10 (calculated as polystyrene).

The embodiments of the invention in which an exclusive property or privilege is claimed are defined as follows:

1. Polyalkylene ether glycol copolymer having a number-average molecular weight of 500 to 10,000 and having hydroxyl groups at both ends of the molecule, said copolymer consisting essentially of recurring structural units of the following formulae (I) and (II) in a molar ratio of from 1/99 to 99/1:

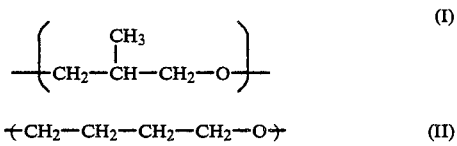

2. Polyalkylene ether glycol copolymer according to claim 1 wherein the molar ratio of units (I) to units (II) is 5/95 to 95/5 and the number-average molecular weight of said copolymer is 500 to 6,000.

3. Polyalkylene ether glycol copolymer as claimed in claim 1 in which the molar ratio of (I)/(II) is 99-10/1-90.

4. A polyalkylene ether glycol copolymer as claimed in claim 1, wherein said copolymer is prepared by a process which comprises subjecting a mixture of 3-methyloxethane and tetrahydrofuran, wherein the 3-methyloxetane/tetrahydrofuran molar ratio is higher than 1, to ring-opening polymerization in the presence of a catalytically effective amount of a hydroacid catalyst under conditions effective to obtain a copolymerized product, then saponifying said copolymerized product to form said copolymer, and then recovering said copolymer.

5. A polyalkylene ether glycol copolymer having a number-average molecular weight in the range of 500 to 6,000 and having hydroxyl groups at both ends of the molecule, said copolymer consisting of recurring structural units of the following formula (I) and (II) in a molar ratio (I)/(II) of 99-10/1-90:

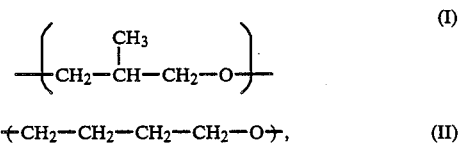

said copolymer being prepared by a process consisting essentially of the steps of:
(1) forming a mixture of 3-methyloxetane and tetrahydrofuran having a 3-methyloxetane/tetrahydrofuran molar ratio higher than 1;
(2) then cooling said mixture, adding a catalytically effective amount of a hydroacid catalyst to said mixture to thereby effect a ring-opening polymerization reaction of 3-methyloxetane with tetrahydrofuran, then warming said mixture;
(3) then adding water to said mixture to terminate the reaction and obtain a copolymerized product;
(4) then saponifying the end groups of said product to form said copolymerized copolymer;
(5) then recovering said copolymer.

6. A polyalkylene ether glycol copolymer as claimed in claim 5, wherein in said step (2), said mixture is first cooled to about −60° C., then said hydroacid catalyst is added, said hydroacid catalyst consisting of acetic anhydride and perchloric acid, then said mixture is warmed to at least 0° C. to conduct said reaction.

7. A polyalkylene ether glycol copolymer as claimed in claim 5, wherein said hydroacid catalyst is selected from the group consisting of perchloric acid/fuming sulfuric acid, perchloric acid/acetic anhydride, and fluorosulfonic acid.

8. A polyalkylene ether glycol copolymer as claimed in claim 5, wherein said copolymer has the infrared absorption spectrum given in FIG. 1 of the drawings referred to in the foregoing specification.

9. A polyalkylene ether glycol copolymer as claimed in claim 5, wherein said copolymer has the nuclear magnetic resonance spectrum given in FIG. 2 of the drawings referred to in the foregoing specification.

10. A polyalkylene ether glycol copolymer as claimed in claim 5, wherein said copolymer has a ratio $\overline{M}_w/\overline{M}_n$, calculated as polystyrene, in the range of 1.80 to 2.20, and the average molecular weight of said copolymer calculated from the hydroxyl value thereof is in the range of 1,264 to 1,825.

* * * * *